United States Patent
Bengtsson

(10) Patent No.: US 9,654,945 B2
(45) Date of Patent: May 16, 2017

(54) ELECTRONIC DEVICE WITH MESSAGE HANDLING FUNCTIONS

(75) Inventor: Henrik Bengtsson, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 355 days.

(21) Appl. No.: 13/519,053

(22) PCT Filed: Jan. 26, 2012

(86) PCT No.: PCT/IB2012/000117
§ 371 (c)(1),
(2), (4) Date: Jun. 25, 2012

(87) PCT Pub. No.: WO2013/076533
PCT Pub. Date: May 30, 2013

(65) Prior Publication Data
US 2014/0194151 A1    Jul. 10, 2014

Related U.S. Application Data

(60) Provisional application No. 61/562,496, filed on Nov. 22, 2011.

(51) Int. Cl.
*H04W 4/12* (2009.01)
*H04W 4/14* (2009.01)
*H04L 12/58* (2006.01)

(52) U.S. Cl.
CPC ............ *H04W 4/14* (2013.01); *H04L 12/581* (2013.01); *H04L 12/589* (2013.01); *H04L 51/04* (2013.01); *H04L 12/5835* (2013.01)

(58) Field of Classification Search
CPC .................................. H04W 4/12; H04W 4/14
(Continued)

(56) References Cited

U.S. PATENT DOCUMENTS

2008/0133742 A1\* 6/2008 Southiere ................ H04L 67/24
709/224
2010/0167762 A1\* 7/2010 Pandey .................... H04W 4/12
455/456

(Continued)

FOREIGN PATENT DOCUMENTS

CN        1574796 A    2/2005
CN     101227652 A    7/2008
(Continued)

OTHER PUBLICATIONS

International Search Report and Written Opinion from corresponding International Application No. PCT/IB2012/000117, mailed on Jun. 12, 2012.

*Primary Examiner* — Asghar Bilgrami
(74) *Attorney, Agent, or Firm* — Renner, Otto, Boisselle & Sklar, LLP.

(57) ABSTRACT

An electronic device (12) is capable of sending chat-style messages by instant message (IM) messaging and short message service (SMS) messaging. IM messaging is preferred, but a message will be sent by SMS messaging upon user authorization when IM messaging for the electronic device is not available. When IM messaging is not available for a message destination electronic device (14), the user of the electronic device will be notified that the transmission mechanism is SMS messaging and an attempt to wake-up IM messaging in the message destination electronic device will be made.

18 Claims, 8 Drawing Sheets

(58) Field of Classification Search
USPC .......................................................... 455/466
See application file for complete search history.

(56) References Cited

U.S. PATENT DOCUMENTS

| | | | | |
|---|---|---|---|---|
| 2011/0028167 A1* | 2/2011 | Cryderman | ........... | H04W 88/04 |
| | | | | 455/466 |
| 2011/0029923 A1* | 2/2011 | Xu | ........... | G06Q 10/10 |
| | | | | 715/825 |
| 2011/0086647 A1* | 4/2011 | Riddle | ........... | G06Q 10/10 |
| | | | | 455/466 |
| 2011/0179126 A1* | 7/2011 | Wetherell | ........... | H04L 51/36 |
| | | | | 709/206 |
| 2013/0165081 A1* | 6/2013 | Wuthnow | ........... | H04N 21/235 |
| | | | | 455/411 |

FOREIGN PATENT DOCUMENTS

| | | | | |
|---|---|---|---|---|
| EP | 1484703 | | 12/2004 | |
| EP | 1484703 A1 * | 12/2004 | ........... | G06Q 10/107 |
| EP | 2160051 | | 3/2010 | |
| EP | 2160051 A1 * | 3/2010 | | |

* cited by examiner

ELECTRONIC DEVICE WITH MESSAGE HANDLING FUNCTIONS

TECHNICAL FIELD OF THE INVENTION

The technology of the present disclosure relates generally to electronic devices and, more particularly, to an electronic device that exchanges messages with another electronic device.

BACKGROUND

Electronic devices, such as mobile telephones, have a number of communications features. One popular feature is chat-style messaging. In the past, chat-style messages were sent exclusively over one of a short message service (SMS) platform using cellular connectivity between the electronic device and a subscriber network. Alternatively, the chat-style messages were sent exclusively over an instant message (IM) platform using an Internet protocol (IP) data connectivity between the electronic device and the subscriber network or over IP data connectivity between the electronic device and the Internet through an access point (e.g., a WiFi access point) separate from the subscriber network.

More recently, SMS messaging and IM messaging have been combined. When IM messaging is available due to the data connections of the electronic, the message will be sent via IM. But when IM messaging is not available, the message will be sent via SMS messaging. This arrangement has lead to issues when one of the message-sending device does not have data connectivity for IM messaging or the destination device for the message does not have data connectivity for IM messaging. For instance, the use of SMS messaging may incur extra cost for a sending device and/or a receiving device depending on corresponding agreements with the operator of the subscription network. As another example, the delivery of a message may be delayed while waiting for IP data connectivity to be restored to enable delivery of the message via IM messaging. In some cases, if delivery via IM messaging does not occur within a predetermined amount of time, the message will be rerouted by SMS messaging without the knowledge of the user of the sending device or the user of the receiving device.

Mobile devices may not have IP data connectivity for one or more reasons, such the device not having a "data plan" subscription with a subscriber network, the device is currently experiencing a poor subscriber network connection, the device is located where the subscriber network does not support IP data connectivity (e.g., mainly in developing countries), the device is located where the device is in roaming mode with respect to the device's subscriber network such that IP data traffic is not allowed, the device is located where WiFi is not available, or some other reason.

SUMMARY

To enhance handling of chat-style messages in electronic devices, the present disclosure describes techniques for messaging handling when one or both of the sending device or the receiving device does not have IM messaging capability through an IP data connection.

According to one aspect of the disclosure, an electronic device includes a radio circuit that establishes wireless communications over a connection that supports short message service (SMS) messaging and a connection that supports instant message (IM) messaging; and a control circuit that executes a messaging client such that the electronic device is configured to: (a) receive user entry of a message and a command to send the message; (b) determine that IM messaging is not available at the time that the command to send the message is received; (c) query the user to determine whether the message should be sent immediately by SMS messaging or wait for IM messaging to become available; and (d) transmit the message by SMS messaging when the user selects sending the message by SMS messaging in (c).

According to one embodiment of the electronic device, if IM messaging is available in (b), the electronic device is configured to transmit the message by IM messaging.

According to one embodiment of the electronic device, if the user selects waiting in (c), the electronic device is configured to determine that IM messaging has been restored and transmit the message by IM messaging.

According to one embodiment of the electronic device, the connection that supports SMS messaging is a cellular circuit-switched network connection with a subscriber network.

According to one embodiment of the electronic device, the connection that supports IM messaging is one of a cellular packet-switched network connection with a subscriber network or a packet switched data connection to the Internet apart from the subscriber network.

According to another aspect of the disclosure, a method of handling messages in an electronic device that has a radio circuit that establishes wireless communications over a connection that supports short message service (SMS) messaging and a connection that supports instant message (IM) messaging includes (a) receiving user entry of a message and a command to send the message; (b) determining that IM messaging is not available at the time that the command to send the message is received; (c) querying the user to determine whether the message should be sent immediately by SMS messaging or wait for IM messaging to become available; and (d) transmitting the message by SMS messaging when the user selects sending the message by SMS messaging in (c).

According to one embodiment of the method, if IM messaging is available in (b), transmitting the message by IM messaging.

According to one embodiment of the method, if the user selects waiting in (c), determining that IM messaging has been restored and transmitting the message by IM messaging.

According to one embodiment of the method, the connection that supports SMS messaging is a cellular circuit-switched network connection with a subscriber network.

According to one embodiment of the method, the connection that supports IM messaging is one of a cellular packet-switched network connection with a subscriber network or a packet switched data connection to the Internet apart from the subscriber network.

According to another aspect of the disclosure, an electronic device includes a radio circuit over which messages for a message destination electronic device are transmitted by one of short message service (SMS) messaging or instant message (IM) messaging; and a control circuit that executes a messaging client such that the electronic device is configured to: (a) determine that a chat associated with the message destination electronic device has been opened; (b) determine whether the message destination electronic device currently has message receipt capability over IM messaging; (c) when the message destination electronic device currently has message receipt capability over IM messaging, indicate to a user of the electronic device that messages will be sent to the message destination electronic device by IM messaging; and (d) when the message destination electronic device does not currently have message receipt capability over IM messaging, indicate to the user of the electronic device that messages will be sent to the message destination electronic device by SMS messaging.

According to one embodiment of the electronic device, (b) includes communicating with a message service server to determine the availability of the message destination electronic device to receive messages over IM messaging.

According to one embodiment of the electronic device, the message destination electronic device has message receipt capability over IM messaging if the message destination electronic device has an active session with an IM messaging service of the message service server.

According to one embodiment of the electronic device, if the message destination electronic device does not currently have message receipt capability over IM messaging, the communication from the electronic device triggers the message service server to send a wake-up message to the message destination electronic device to wake-up an IM messaging component of a messaging client of the message destination electronic device.

According to one embodiment of the electronic device, if the message destination electronic device does not currently have message receipt capability over IM messaging, the electronic device further configured to provoke a message service server to send a wake-up message to the message destination electronic device to wake-up an IM messaging component of a messaging client of the message destination electronic device.

According to another aspect of the disclosure, a method of handling messages in an electronic device that has a radio circuit over which messages for a message destination electronic device are transmitted by one of short message service (SMS) messaging or instant message (IM) messaging includes (a) determining that a chat associated with the message destination electronic device has been opened; (b) determining whether the message destination electronic device currently has message receipt capability over IM messaging; (c) when the message destination electronic device currently has message receipt capability over IM messaging, indicating to a user of the electronic device that messages will be sent to the message destination electronic device by IM messaging; and (d) when the message destination electronic device does not currently have message receipt capability over IM messaging, indicating to the user of the electronic device that messages will be sent to the message destination electronic device by SMS messaging.

According to one embodiment of the method, (b) includes communicating with a message service server to determine the availability of the message destination electronic device to receive messages over IM messaging.

According to one embodiment of the method, the message destination electronic device has message receipt capability over IM messaging if the message destination electronic device has an active session with an IM messaging service of the message service server.

According to one embodiment of the method, if the message destination electronic device does not currently have message receipt capability over IM messaging, the communication from the electronic device triggers the message service server to send a wake-up message to the message destination electronic device to wake-up an IM messaging component of a messaging client of the message destination electronic device.

According to one embodiment of the method, if the message destination electronic device does not currently have message receipt capability over IM messaging, the electronic device provoking a message service server to send a wake-up message to the message destination electronic device to wake-up an IM messaging component of a messaging client of the message destination electronic device.

DETAILED DESCRIPTION OF EMBODIMENTS

Figure 1:
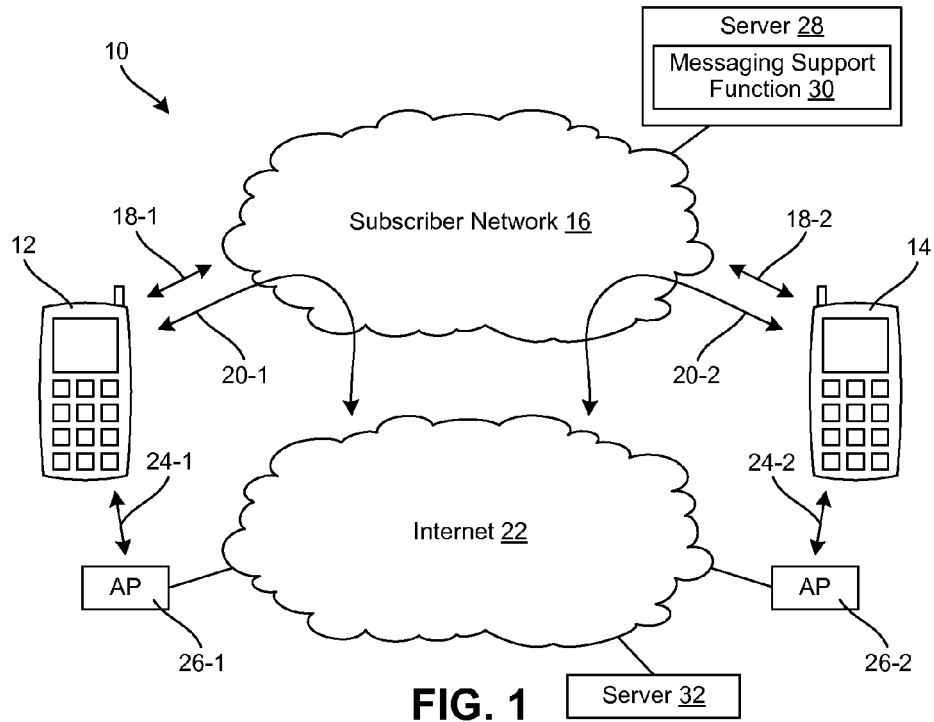
FIG. 1 is a schematic view of a communication system that includes a message-sending electronic device and a message destination electronic device.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described below in conjunction with the appended figures are various embodiments of an electronic device and method of controlling the electronic device. The electronic device is typically a portable electronic device, and may take any form factor including, but not limited to, a tablet computing device, a mobile telephone, a laptop computer, a gaming device, a camera, a television, and a media player. The illustrated examples show a mobile telephone, but applicability of aspects of the invention is not limited to mobile telephones.

Referring to FIG. 1, schematically shown is a communication system 10 in which a first electronic device (also referred to as a message-sending electronic device 12) transmits a message addressed for a second electronic device (also referred to as a message destination electronic device 14). In one embodiment, the message is chat-style message. Types of chat-style messages are text messages and instant messages. The chat-style messages contain characters (e.g., letters, numbers, symbols, emoticons, etc.) that are entered by a user. Chat-style messages are typically of short length. For instance, a chat-style message of a few hundred characters would be considered long in most circumstances. The chat-style messages tend to start or are part of a string of messages that collectively form a "conversation," referred to as a chat string or a chat session, between two or more parties.

The electronic devices 12, 14 are configured to engage in wireless communications, such as voice calls, video calls, data transfers, and the like. Data transfers may include, but are not limited to, receiving streaming content, receiving data feeds, downloading and/or uploading data (including Internet content), receiving or sending messages (e.g., chat-style messages, electronic mail messages, multimedia messages), and so forth.

To facilitate the wireless communications, various communication options are available to the electronic devices 12, 14. In the illustrated embodiment, the electronic device 12 may communicate with a subscriber network 16. The subscriber network is typically a network deployed by a service provider with which the user of the electronic device 12 subscribes for phone and/or data service. Communications between the electronic device 12 and the subscriber network may take place over a cellular circuit-switched network connection 18-1. Exemplary interfaces for cellular circuit-switched network connections include, but are not limited to, global system for mobile communications (GSM), code division multiple access (CDMA), wideband CDMA (WCDMA), and advanced versions of these standards. The cellular circuit-switched network connection 18-1 supports communications such as voice communications (e.g., telephone calls) and delivery of messages by SMS messaging.

Communications between the electronic device 12 and the subscriber network also may take place over a cellular packet-switched network connection 20-1. The cellular packet-switched network connection 20-1 supports IP data communications, including delivery of messages by IM messaging and accessing the Internet 22 by way of the subscriber network 16. Cellular packet-switched network connections with subscriber networks are commonly referred to as falling under a "data plan" offered by the operator of the subscriber network. Exemplary interfaces for cellular packet-switched network connections include, but are not limited to, general packet radio service (GPRS) and 4G long-term evolution (LTE).

The cellular circuit-switched network connection 18-1 and the cellular packet-switched network connection 20-1 between the electronic device 12 and the subscriber network 16 may be established by way of a transmission medium (not specifically illustrated) of the subscriber network 16. The transmission medium may be any appropriate device or assembly, but is typically an arrangement of communications base stations (e.g., cellular service towers, also referred to as "cell" towers).

Another way for the electronic device 12 to access the Internet 22, and send messages by IM messaging, is by using a packet-switched data connection 24-1 apart from the subscriber network 16. In the illustrated embodiment, for example, the electronic device 12 may engage in IP communication by way of an IEEE 802.11 (commonly referred to as WiFi) access point (AP) 26-1 that has connectivity to the Internet.

The electronic device 14 may communicate in similar manners, such as over a cellular circuit-switched network connection 18-2 with the subscriber network 16, over a cellular packet-switched network connection 20-2, and over a packet-switched data connection 24-2 apart from the subscriber network 16 using, for example, a WiFi AP 26-2. In the illustrated embodiment, the electronic device 14 communicates with the same subscriber network 16 as the electronic device 12. In other embodiments, the electronic devices 12, 14 may communicate with different subscriber networks 16.

For purposes of this disclosure, the phrase "data connection online" will refer to the condition when the electronic device 12 has an operative data connection available for the transmission of messages using IM messaging over an IP data connection (the connection 20-1 or the connection 24-1). Also, the phrase "data connection offline" will refer to the condition when the electronic device 12 does not have an operative data connection available for the transmission of messages using IM messaging over an IP data connection (the connection 20-1 or the connection 24-1). When the data connection of the electronic device 12 is offline, it is possible that the connection 18-1 of the electronic device 12 is active and transmission of messages by SMS messaging is available.

Figure 2:
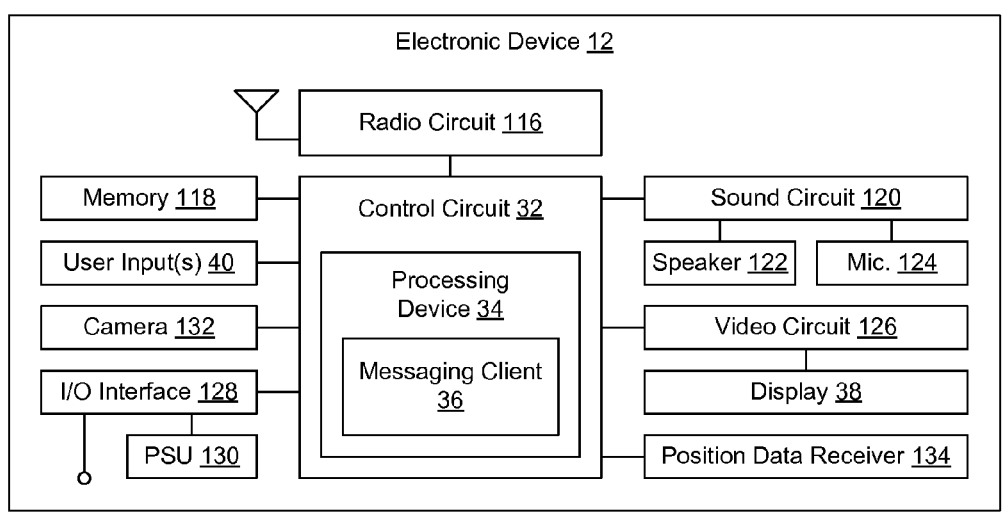
FIG. 2 is a schematic block diagram of the message-sending electronic device.

The subscriber network 16 includes a server 28 (or servers 28) for managing calls placed by and destined to the electronic devices 12, 14, transmitting data to and receiving data from the electronic devices 12, 14, and carrying out any other support functions. In particular, the server 28 supports the messaging functions of the electronic devices 12, 14. Some of the messaging operations of the electronic devices 12, 14 described below rely on actions by the server 28. Accordingly, the server 28 hosts a messaging support function 30 that carries out the tasks described below and other messaging support tasks. As will be appreciated, the server 28 may be configured as a typical computer system used to carry out server functions and may include a processor configured to execute software containing logical instructions that embody the functions of the server 28 (including the messaging support function 30) and a memory to store such software and related data. In other embodiments, the messaging support function 30 may be carried out by a third party server 32 that is operatively interfaced via the Internet 22. The server 32 may be configured as a typical computer system used to carry out server functions and may include a processor configured to execute software containing logical instructions that embody the functions of the server 32 (including messaging support functionality) and a memory to store such software and related data With additional reference to FIG. 2, a schematic block diagram of the electronic device 12 is illustrated. The electronic device 14 may be configured in the same manner or in a similar manner. Therefore, the electronic device 14 will not be described separately.

The electronic device 12 includes a control circuit 32 that is responsible for overall operation of the electronic device 12. For this purpose, the control circuit 12 includes a processor 34 that executes various applications, including a messaging client 36. The messaging client 36 embodies the below-described messaging operations of the electronic device 12. In one embodiment, the messaging client 36 is embodied in the form of executable logic (e.g., lines of code, software, or a program) that is stored on a non-transitory computer readable medium (e.g., a memory) of the electronic device 12 and is executed by the control circuit 32. The described operations may be thought of as a method that is carried out by the electronic device 12. Variations to the illustrated and described techniques are possible and, therefore, the disclosed embodiments should not be considered the only manner of carrying out electronic device 12 messaging functions. Also, while the appended figures show exemplary displayed visual content, the content may be different than that shown. It will be further understood that the electronic device 14 includes its own messaging client, which may be the same software platform as the messaging client 36 or a different software platform.

The electronic device 12 further includes a display 38 for displaying information to a user and one or more user inputs 40 for receiving user input for controlling operation of the electronic device 12. Exemplary user inputs include, but are not limited to, a touch input that overlays the display 38 for touch screen functionality, one or more buttons, motion sensors (e.g., gyro sensors, accelerometers), and so forth. Additional aspects of the electronic device 12 will be described below.

Figure 3:
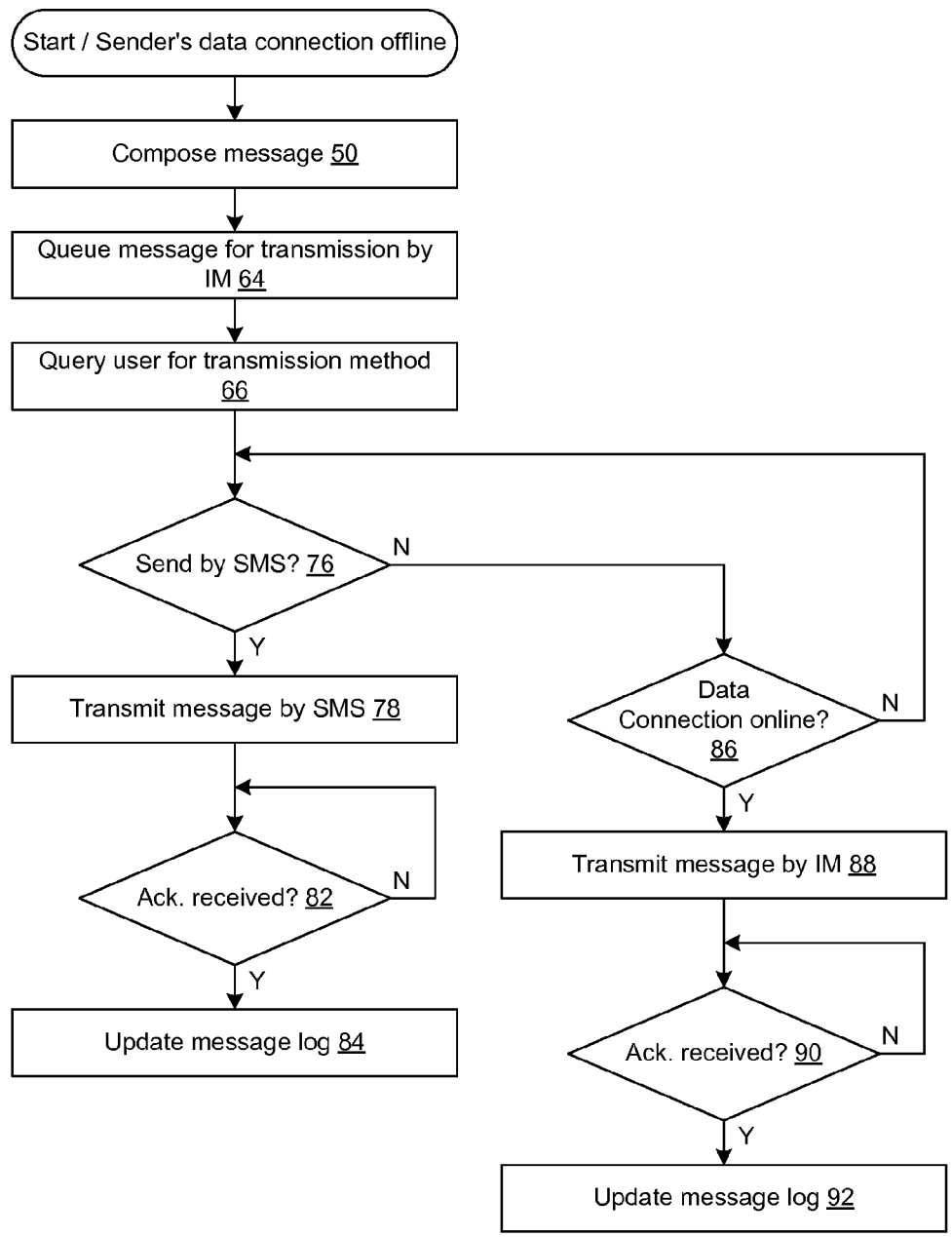
FIG. 3 is a flow diagram of message-sending operations of the message-sending electronic device when the message-sending electronic device does not have IP data connectivity.

With additional reference to FIG. 3, illustrated is an exemplary flow diagram representing steps that may be carried out to implement message management by the electronic device 12 when the data connection of the electronic device 12 is offline. Although illustrated in a logical progression, the illustrated blocks may be carried out in other orders and/or with concurrence between two or more blocks. Therefore, the illustrated flow diagram may be altered (including omitting steps) and/or may be implemented in an object-oriented manner or in a state-oriented manner.

The logical flow may commence in a state where the data connection of the electronic device 12 is offline. Therefore, the electronic device 12 will not be able to engage in transmitting chat-style messages by IM messaging. It will be assumed, however, that the electronic device 12 is able to transmit chat-style messages by SMS messaging. If the data connection of the electronic device 12 were online, then the operations shown in FIG. 3 may be omitted and, by default configuration, messages sent from the electronic device 12 may be transmitted by IM messaging.

Figures 4, 5:
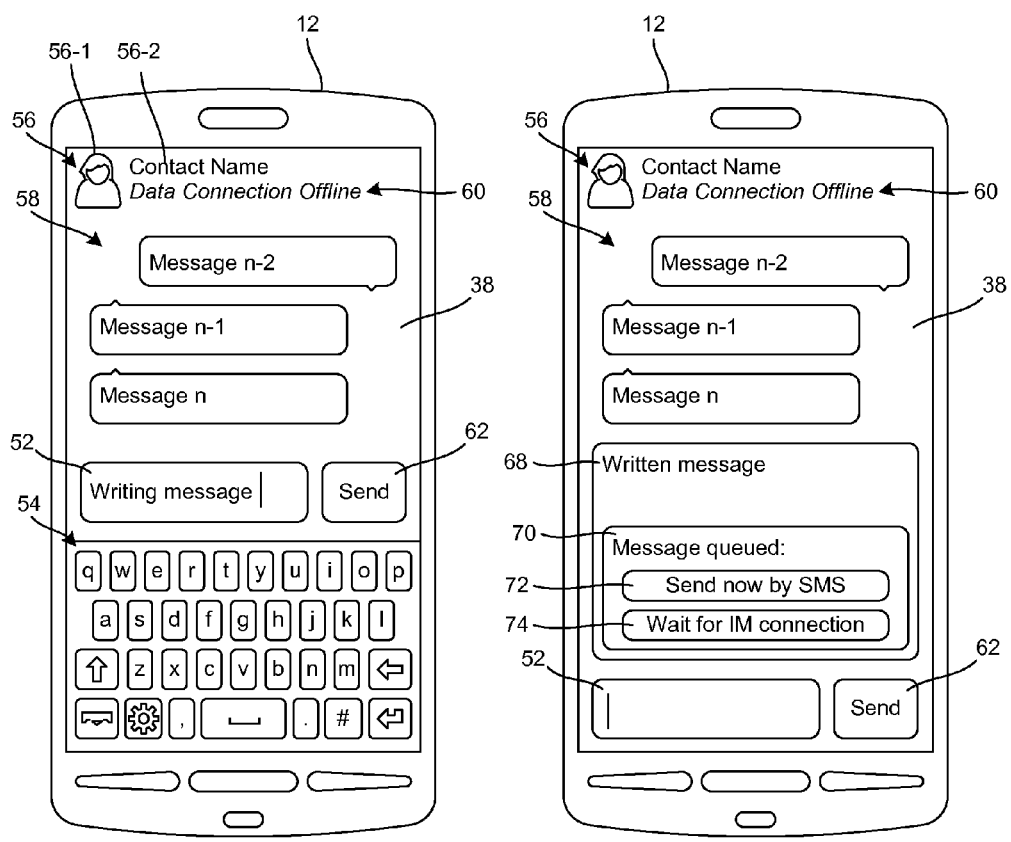
FIGS. 4 through 9 are exemplary screen shots of the message-sending electronic device during the various operations of FIG. 3.

In block 50 the user composes a chat-style message. With additional reference to FIG. 4, shown is a screen shot of the electronic device 12 during message composition. In the illustrated embodiment, the display 38 shows a message composition field 52 that shows the characters of the message as the message is being composed. The display 38 also shows a keyboard 54 from which the user selects desired characters. In the illustrated embodiment, a chat with a user of the electronic device 14 is open such that the displayed content includes a contact identifier 56 of the user of the electronic device 14 and a message log 58 of prior messages exchanged between the electronic device 12 and the electronic device 14. The contact identifier 56 includes the display of a contact name 56-1 associated in the electronic device 12 for the user of the electronic device 14 and, if available, a photo 56-2 associated in the electronic device 12 for the user of the electronic device 14. The message log 58 shows the content of recent messages exchanged between the electronic devices 12 and 14. The last message sent to or received from the electronic device 14 is identified as "message n," the next to last message set to or received from the electronic device 14 is identified as "message n−1," and so forth.

Another displayed item includes a connectivity indicator 60. The connectivity indicator 60 indicates whether the electronic device 12 is capable of sending messages by IM messaging. As indicated, a current state of the electronic device 12 is that the electronic device 12 is not capable of sending messages by IM messaging. Therefore, in the illustrated embodiment, the connectivity indicator 60 reads "Data Connection Offline." If the electronic device 12 were capable of sending messages by IM messaging, the connectivity indicator 60 could read "Data Connection Online" or the connectivity indicator 60 could be blank (e.g., not shown on the display 38), such as in the embodiment shown in FIGS. 8 and 9.

When the user has completed entry of the desired message, the user may command sending of the message. In one embodiment, the user may command sending of the message by pressing a displayed send button 62. In block 64, entry of the send command is detected and the message is queued for transmission by IM messaging. But it is uncertain when the electronic device 12 will restore the capability to carry out IM messaging. Therefore, in block 66, the electronic device 12 may query the user for a transmission technique that the user would like to use.

An exemplary query is shown in FIG. 5. In the example of FIG. 5, the written message is displayed in a log entry 68 for the user's reference. Also displayed is an indication 70 that the send command was successfully entered. In the illustrated embodiment, the indication 70 reads "message queued," but it will be recognized that other indicators may be used. One or more selection buttons to allow the user to input how to send the message are displayed. In the illustrated embodiment, a button 72 to send the message immediately by SMS messaging is displayed. Also displayed is a button 74 that commands waiting for IM messaging capability to be restored before sending. Other options may be possible, such as a button that allows sending of the message by SMS messaging in a certain amount of time (e.g., about 5 minutes) if the IM messaging capability is not restored before the amount of time elapses.

Figures 6, 7:
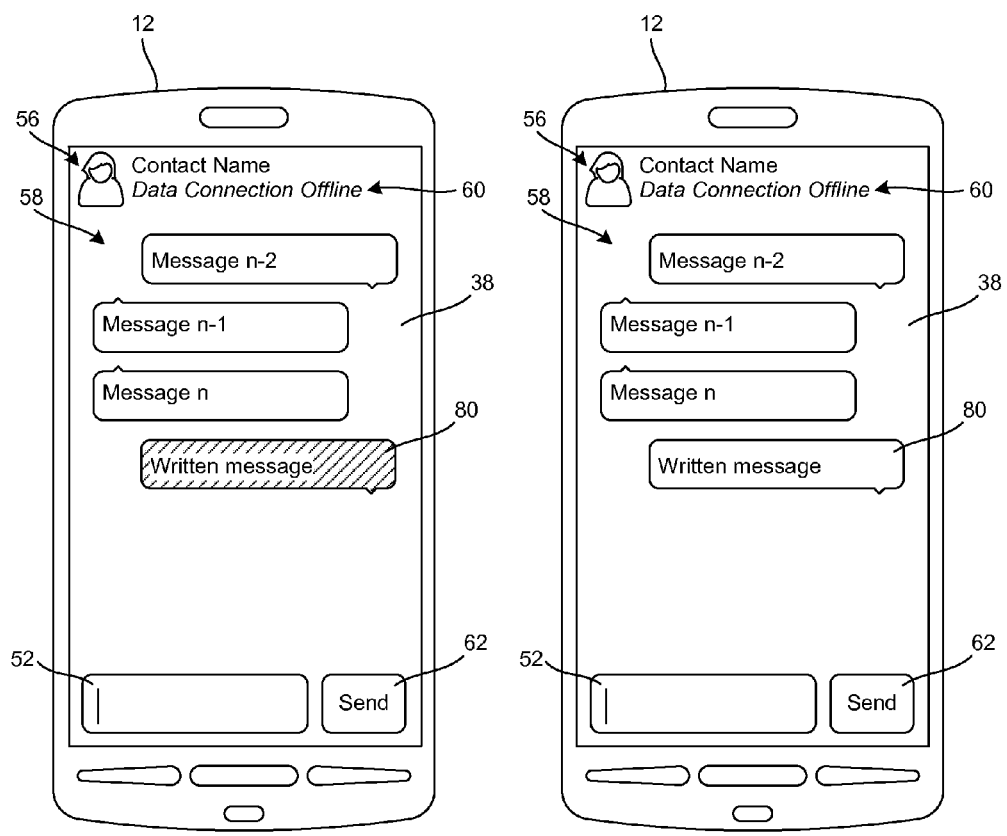

Next, in block 76, a determination is made as to whether the user selected delivery by the SMS messaging option. If a positive determination is made in block 76, the logical flow proceeds to block 78 where the message is transmitted by SMS messaging. With additional reference to FIG. 6, the message log 58 may be updated at this point to show an entry 80 for the written message as the most recent message in the chat string. At this point, the entry 80 will be shown in a manner to indicate that the message is undergoing transmission and not yet delivered to the electronic device 14. In the embodiment of FIG. 6, this is shown with hatching through the entry 80 but other visual techniques (such as graying the text of the written message) are possible. After receiving a delivery acknowledgment in block 82, the message log is updated in block 84 to show that the message has been delivered. For example, as shown in the embodiment of FIG. 7, the entry 80 for the written message is shown without hatching. In other embodiments, the text of the written message is shown with full color saturation (not grayed) similar to the other messages in the message log 58.

If a negative determination is made in block 76, the logical flow may proceed to block 86 where the electronic device 12 will wait until the data connection goes online (e.g., IM messaging capability is restored). Up until the point that the data connection goes online and the message is sent using IM messaging, the user may elect to send the message by SMS messaging, as indicated by return arrow from block 86 to block 76.

Figure 8:
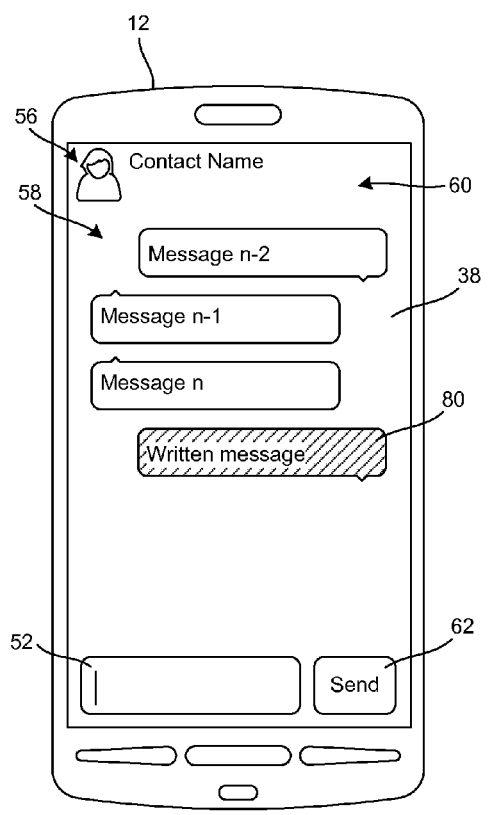
Figure 9:
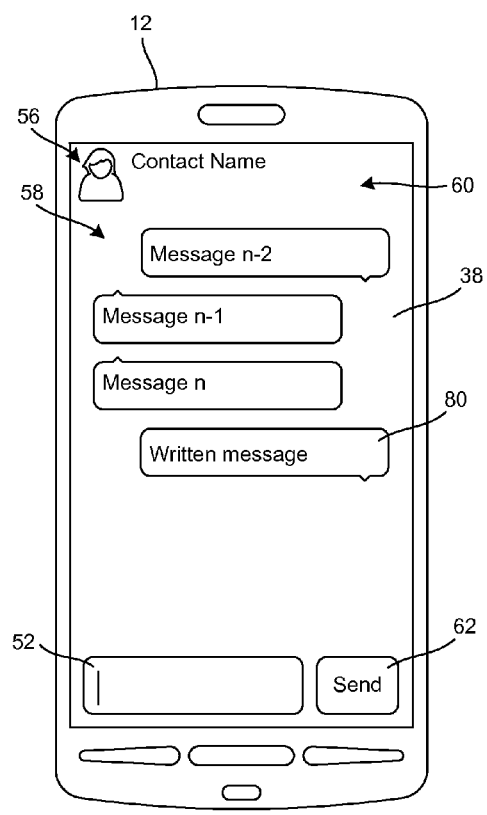

Assuming that the message has not already been sent by SMS when the data connection goes online, the logical flow will proceed from block 86 to block 88. In block 88, the message is transmitted by IM messaging. As indicated, FIGS. 8 and 9 show messaging screens when the data connection is online. The difference in FIGS. 8 and 9 relative to FIGS. 6 and 7 is that the connectivity indicator 60 no longer indicates the offline status. In FIG. 8, once the message is transmitted by IM messaging, the message log 58 is updated to show entry 80 for the written message as the most recent message in the chat string. At this point, the entry 80 will be shown in a manner to indicate that the message is undergoing transmission and not yet delivered to the electronic device 14. In the embodiment of FIG. 8, this is shown with hatching through the entry 80 but other visual techniques (such as graying the text of the written message) are possible. After receiving a delivery acknowledgment in block 90, the message log is updated in block 92 to show that the message has been delivered. For example, as shown in the embodiment of FIG. 9, the entry 80 for the written message is shown without hatching. In other embodiments, the text of the written message is shown with full color saturation (not grayed) similar to the other messages in the message log 58.

Figure 10:
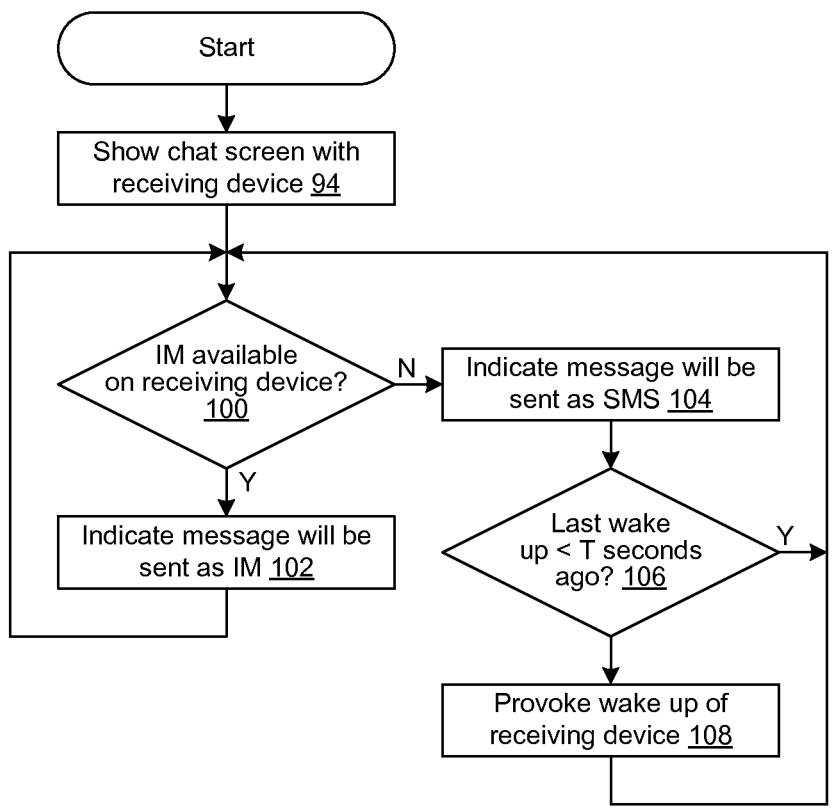
FIG. 10 is a flow diagram of message-sending operations of the message-sending electronic device when the message destination electronic device is not known to the message-sending electronic device to have IP data connectivity.

With additional reference to FIG. 10, illustrated is an exemplary flow diagram representing steps that may be carried out to implement message management by the electronic device 12 when the message destination electronic device 14 not available for receiving messages using IM messaging. The message destination electronic device 14 may not be available for receiving messages using IM messaging for one of several reasons. These reasons include, for example, that the electronic device 14 is powered off, that the electronic device 14 does not presently have a communications connection that supports IM messaging (e.g., the cellular packet-switched network connection 20-2 and the packet-switched data connection 24-2 are not operative), and the electronic device has an operative communications connection that supports IM messaging but an IM messaging component of the messaging client 36 of the electronic device 14 is in an inactive state. The inactive state of the IM messaging component of the messaging client 36 is a state in which the messaging client 36 does not have an operative session with IM messaging services of the server 28 and/or server 32. This saves power in the electronic device 14 and saves a socket on the server 28 and/or server 32.

Although illustrated in a logical progression, the illustrated blocks of FIG. 10 may be carried out in other orders and/or with concurrence between two or more blocks. Therefore, the illustrated flow diagram may be altered (including omitting steps) and/or may be implemented in an object-oriented manner or in a state-oriented manner.

Figure 11:
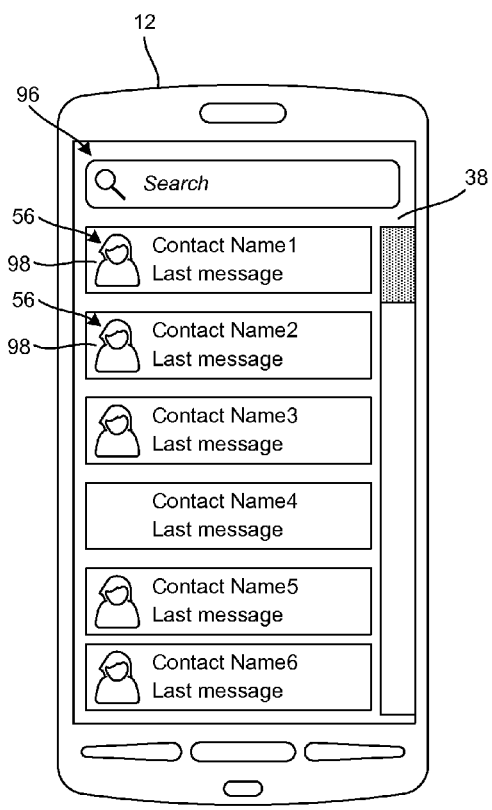
FIGS. 11 through 13 are exemplary screen shots of the message-sending electronic device during the various operations of FIG. 10.
Figure 12:
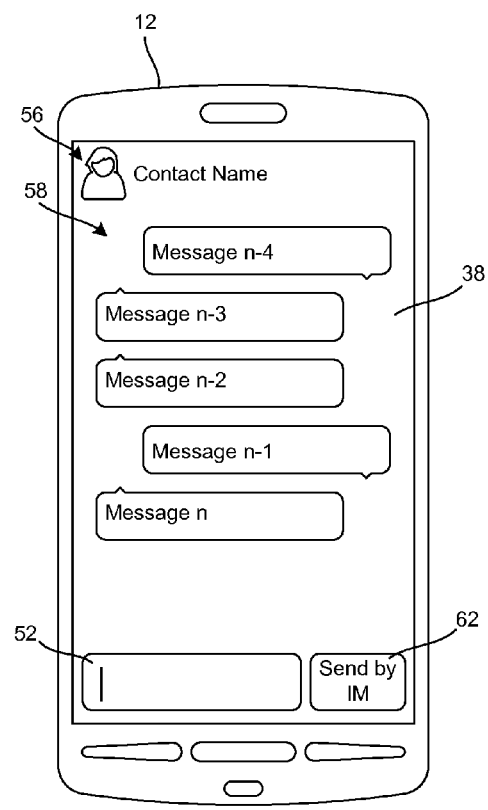

The logical flow may commence in block 94 where the user of the electronic device 12 takes action to show a chat screen for the message receiving electronic device 14, such as by opening a chat associated with the electronic device 14. Opening a chat may include selecting of the user of the electronic device 14 from a contact list resident on the electronic device 12. Alternatively, and as illustrated in FIG. 11, opening a chat may include navigating to a messaging screen 96 with the electronic device 12 on which each chat stored by the electronic device 12 is shown in corresponding entries 98 and selecting a desired one of the entries 98. Each entry 98 may display, for example, the contact identifier 56 of the other user participating in the chat and the most recent message from the chat. As illustrated in FIG. 12, for example, when the user selects one of the entries 98, the displayed content may transition to a screen showing the message log 58 for the selected chat. The message composition field 52 and send button 62 also may be displayed. If the user selects the message composition field 52, the keyboard 54 may be added to the display 38. Alternatively, the keyboard 54 may be displayed by opening the chat. Another situation in which the chat screen may be considered to be shown is when the electronic device 10 is woken from a sleep state with the chat screen as the current screen.

Next, in block 100, the IM messaging capability (or IM status) of the electronic device 14 for which the chat was opened is determined. This information may be obtained by communicating with the server 28 and/or server 32 to obtain availability information for the electronic device 14, such as by sending a status request message. The status may be available or unavailable. An available status means that it is known to the electronic device 12 that the electronic 14 is capable of receiving messages by IM messaging at the present time. The status may be determined to be available if the IM messaging services of the server 28 and/or server 32 has an operative session with the IM messaging component of the messaging client 36 of the electronic device 14. In all other cases, the status will be considered to be unavailable. In one embodiment, if it is determined that IM messaging of the electronic device 14 is unavailable, the communication between the electronic device and the server 28 and/or server 32 to make this determination triggers the server 28 and/or server 32 to send the wake-up message under the assumption that a message for the electronic device 14 is forthcoming If, in block 100, the IM messaging capability of the electronic device 14 is currently available, the logical flow may proceed to block 102. In block 102, the electronic device 12 indicates to the user that if the user were to command sending of a message to the electronic device 14, then the message would be transmitted using IM messaging. This indication will persist until it becomes known to the electronic device 12 that the messaging status of the electronic device 14 has changed. A change in indication may occur at any time, including during composition of a message.

In the illustrated embodiment of FIG. 12, the indication is given by a characteristic of the send button 62. In this embodiment, text on the send button 62 (e.g., text that reads "send by IM") provides the indication. The indication may be conveyed in other manners. For instance, the send button 62 may simply read "send" and a color of the send button 62 may be set to a color corresponding to the availability of IM messaging with the electronic device 14 (e.g., the send button 62 may be blue). Any message that the user sends while IM messaging of the electronic device 14 is available will be sent by IM messaging.

Returning to block 100, if IM messaging of the electronic device 14 is determined to be unavailable at the current time, then the logical flow proceeds to block 104. In block 104, the electronic device 12 indicates to the user that if the user were to command sending of a message to the electronic device 14, then the message would be transmitted using SMS messaging. This indication will persist until it becomes known to the electronic device 12 that the messaging status of the electronic device 14 has changed. A change in indication may occur at any time, including during composition of a message.

Figure 13:
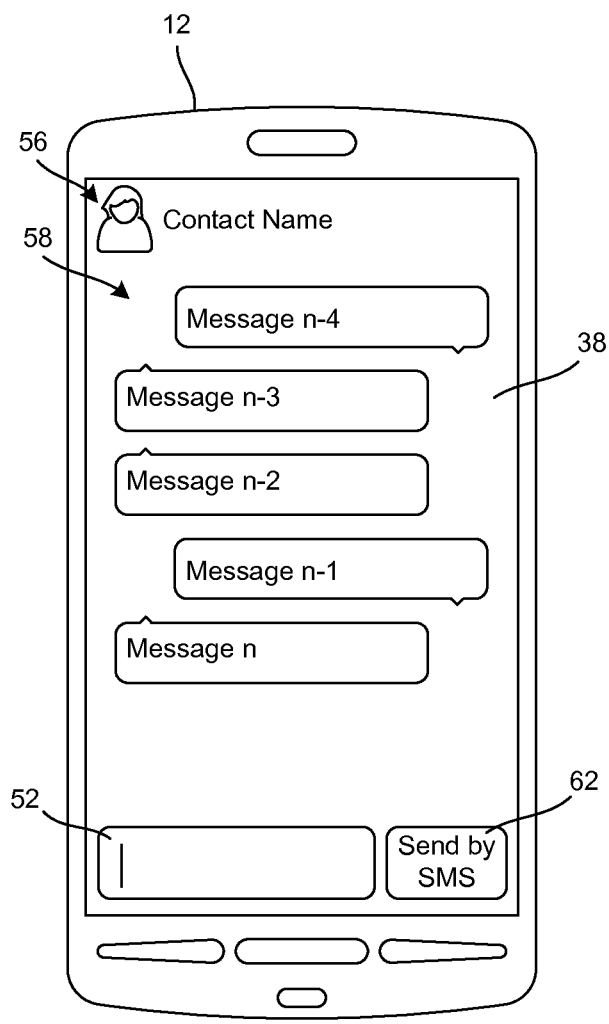

This situation is illustrated in FIG. 13. In the illustrated embodiment of FIG. 13, the indication is given by a characteristic of the send button 62. In this embodiment, text on the send button 62 (e.g., text that reads "send by SMS") provides the indication. The indication may be conveyed in other manners. For instance, the send button 62 may simply read "send" and a color of the send button 62 may be set to a color corresponding to the unavailability of IM messaging with the electronic device 14 (e.g., the send button 62 may be black). Any message that the user sends while IM messaging of the electronic device 14 is unavailable will be sent by SMS messaging. Alternatively, the user may be given the option to send the message immediately by SMS messaging or wait for the IM messaging capability of the electronic device 14 to be restored similar to the approach taken in connection with FIG. 3.

Next, in block 106, the electronic device 12 determines how much time has elapsed since the last attempt to wake up the IM messaging capability in the electronic device 14. If the length of time is less than a predetermined threshold T, the logical flow will continue to loop. If however, the predetermined threshold T has been exceeded, the logical flow proceeds to block 108. In block 108, the IM messaging component of the messaging client 36 in the electronic device 14 is provoked to wake-up to establish a session with the IM messaging services of the server 28 and/or server 32. In one embodiment, the electronic device 12 requests the server 28 and/or server 32 to send a wake-up message to the electronic device 14. In one embodiment, the wake-up message is a cloud to device (C2D) notification message or a push notification service message (e.g., in Apple Computer devices, this type of message is referred to as an Apple push notification service (APNS) message). If the wake-up of block 108 is successful or the IM messaging capability of the electronic device restores for any other reason (e.g., the electronic device 14 restores an IM messaging session with the server 28 and/or server 32), then a positive determination is made in block 100.

In one embodiment, the predetermined threshold T may be about one minute to about ten minutes since the last wake-up attempt or message activity between the electronic devices 12, 14. Therefore, if the electronic device 12 has the chat log 58 for the electronic device 14 open for an extended period (e.g., an hour) without activity it is possible that the IM status of the electronic device 14 is unavailable. If the user of electronic device 12 starts using the electronic device 12 in this state it is possible that the user intends to compose a message for electronic device 14 and the electronic device 12 will commence the process of determining the status of electronic device 14 and, if appropriate, provoke the waking up of the IM messaging component of electronic device 14. But if the electronic devices 12 and 14 are activity chatting (e.g., sending messages back and forth), then attempting to wake-up the IM messaging component of electronic device 14 after the transmission of each message likely would be excessive. Therefore, waiting for the predetermined period of time to elapse will preclude attempting to wake-up the IM messaging component of electronic device 14 after the transmission of each message from electronic device 12 to electronic device 14.

Returning to FIG. 2, additional details of the electronic device 12 will be described. The electronic device 12 includes communications circuitry that enables the electronic device 12 to establish the communication connections that are described above. In the exemplary embodiment, the communications circuitry includes a radio circuit 116. The radio circuit 116 includes one or more radio frequency transceivers and an antenna assembly (or assemblies). Since the electronic device 12 is capable of communicating using more than one standard, the radio circuit 116 represents each radio transceiver and antenna needed for the various supported connection types. The radio circuit 116 further represents any radio transceivers and antennas used for local wireless communications directly with an electronic device, such as over a Bluetooth interface.

As indicated, the electronic device 12 includes the primary control circuit 32 that is configured to carry out overall control of the functions and operations of the electronic device 12. The processor 34 of the control circuit 32 may be a central processing unit (CPU), microcontroller or microprocessor. The processor 34 executes code stored in a memory (not shown) within the control circuit 32 and/or in a separate memory, such as a memory 118, in order to carry out operation of the electronic device 12. The memory 118 may be, for example, one or more of a buffer, a flash memory, a hard drive, a removable media, a volatile memory, a non-volatile memory, a random access memory (RAM), or other suitable device. In a typical arrangement, the memory 118 includes a non-volatile memory for long term data storage and a volatile memory that functions as system memory for the control circuit 32. The memory 118 may exchange data with the control circuit 32 over a data bus. Accompanying control lines and an address bus between the memory 118 and the control circuit 32 also may be present. The memory 118 is considered a non-transitory computer readable medium.

The electronic device 12 may further include a sound circuit 120 for processing audio signals. Coupled to the sound circuit 120 are a speaker 122 and a microphone 124 that enable a user to listen and speak via the electronic device 12, and hear sounds generated in connection with other functions of the device 12. The sound circuit 120 may include any appropriate buffers, encoders, decoders, amplifiers and so forth.

The display 38 may be coupled to the control circuit 32 by a video circuit 126 that converts video data to a video signal used to drive the display 38. The video circuit 126 may include any appropriate buffers, decoders, video data processors and so forth.

The electronic device 12 may further include one or more input/output (I/O) interface(s) 128. The I/O interface(s) 128 may be in the form of typical electronic device I/O interfaces and may include one or more electrical connectors for operatively connecting the electronic device 12 to another device (e.g., a computer) or an accessory (e.g., a personal handsfree (PHF) device) via a cable. Further, operating power may be received over the I/O interface(s) 128 and power to charge a battery of a power supply unit (PSU) 130 within the electronic device 12 may be received over the I/O interface(s) 128. The PSU 130 may supply power to operate the electronic device 12 in the absence of an external power source.

The electronic device 12 also may include various other components. For instance, a camera 132 may be present for taking digital pictures and/or movies. Image and/or video files corresponding to the pictures and/or movies may be stored in the memory 118. As another example, a position data receiver 134, such as a global positioning system (GPS) receiver, may be present to assist in determining the location of the electronic device 12.

Although certain embodiments have been shown and described, it is understood that equivalents and modifications falling within the scope of the appended claims will occur to others who are skilled in the art upon the reading and understanding of this specification.

What is claimed is:

1. An electronic device, comprising:
   a radio circuit that establishes wireless communications over a connection that supports short message service (SMS) messaging and a connection that supports instant message (IM) messaging; and
   a control circuit that executes a messaging client such that the electronic device is configured to:
   (a) receive user entry of a message and a command to send the message;
   (b) determine that IM messaging is not available at a time that the command to send the message is received;
   (c) in response to the command to send the message and the determination that IM messaging is not available, determine whether IM messaging becomes available within a prescribed time period following the time that the command to send the message is received;
   (d) when IM messaging does not become available within the prescribed time period following the time that the command to send the message is received, transmit the message by SMS messaging;

(e) when IM messaging becomes available within the prescribed time period following the time that the command to send the message is received, transmit the message by IM messaging.

2. The electronic device of claim 1, wherein if IM messaging is available in (b), the electronic device is configured to transmit the message by IM messaging.

3. The electronic device of claim 1, wherein the connection that supports SMS messaging is a cellular circuit-switched network connection with a subscriber network.

4. The electronic device of claim 1, wherein the connection that supports IM messaging is one of a cellular packet-switched network connection with a subscriber network or a packet switched data connection to the Internet apart from the subscriber network.

5. A method of handling messages in an electronic device that has a radio circuit that establishes wireless communications over a connection that supports short message service (SMS) messaging and a connection that supports instant message (IM) messaging, comprising:
   (a) receiving user entry of a message and a command to send the message;
   (b) determining that IM messaging is not available at a time that the command to send the message is received;
   (c) in response to the command to send the message and the determination that IM messaging is not available, determine whether IM messaging becomes available within a prescribed time period following the time that the command to send the message is received;
   (d) when IM messaging does not become available within the prescribed time period following the time that the command to send the message is received, transmitting the message by SMS messaging in response to user input to send the message by SMS messaging in (c); and
   (e) when IM messaging becomes available within the prescribed time period following the time that the command to send the message is received, transmitting the message by IM messaging.

6. The method of claim 5, wherein if IM messaging is available in (b), transmitting the message by IM messaging.

7. The method of claim 5, wherein the connection that supports SMS messaging is a cellular circuit-switched network connection with a subscriber network.

8. The method of claim 5, wherein the connection that supports IM messaging is one of a cellular packet-switched network connection with a subscriber network or a packet switched data connection to the Internet apart from the subscriber network.

9. An electronic device, comprising:
   a radio circuit over which messages for a message destination electronic device are transmitted by one of short message service (SMS) messaging or instant message (IM) messaging; and
   a control circuit that executes a messaging client such that the electronic device is configured to:
   (a) determine that a chat associated with the message destination electronic device has been opened;
   (b) determine whether the message destination electronic device currently has message receipt capability over IM messaging; and
   (c) display, on a display of the electronic device, a chat screen containing a message log of messages exchanged with the message destination electronic device and a message composition field for a next message outgoing to the message destination electronic device, wherein:
   if in (b), the message destination electronic device currently has message receipt capability over IM messaging, indicate to a user of the electronic device that the next message outgoing to the message destination electronic device will be sent to the message destination electronic device by IM messaging; and
   if in (b), the message destination electronic device does not currently have message receipt capability over IM messaging, determine whether the message destination electronic device obtains message receipt capability over IM messaging within a certain amount of time and indicate to the user of the electronic device that:
      the next message outgoing to the message destination electronic device will be sent to the message destination electronic device by SMS messaging when the message destination electronic device does not obtain message receipt capability over IM messaging within a certain amount of time; and
      the next message outgoing to the message destination electronic device will be sent to the message destination electronic device by IM messaging when the message destination electronic device obtains message receipt capability over IM messaging within the certain amount of time.

10. The electronic device of claim 9, wherein (b) includes communicating with a message service server to determine the availability of the message destination electronic device to receive messages over IM messaging.

11. The electronic device of claim 10, wherein the message destination electronic device has message receipt capability over IM messaging if the message destination electronic device has an active session with an IM messaging service of the message service server.

12. The electronic device of claim 10, wherein if the message destination electronic device does not currently have message receipt capability over IM messaging, the communication from the electronic device triggers the message service server to send a wake-up message to the message destination electronic device to wake-up an IM messaging component of a messaging client of the message destination electronic device.

13. The electronic device of claim 9, wherein if the message destination electronic device does not currently have message receipt capability over IM messaging, the electronic device further configured to provoke a message service server to send a wake-up message to the message destination electronic device to wake-up an IM messaging component of a messaging client of the message destination electronic device.

14. A method of handling messages in an electronic device that has a radio circuit over which messages for a message destination electronic device are transmitted by one of short message service (SMS) messaging or instant message (IM) messaging, comprising:
   (a) determining that a chat associated with the message destination electronic device has been opened;
   (b) determining whether the message destination electronic device currently has message receipt capability over IM messaging;
   (c) displaying, on a display of the electronic device, a chat screen containing a message log of messages exchanged with the message destination electronic device and a message composition field for a next message outgoing to the message destination electronic device, wherein:

if in (b), the message destination electronic device currently has message receipt capability over IM messaging, indicating to a user of the electronic device that the next message outgoing to the message destination electronic device will be sent to the message destination electronic device by IM messaging; and if in (b), the message destination electronic device does not currently have message receipt capability over IM messaging, determining whether the message destination electronic device obtains message receipt capability over IM messaging within a certain amount of time and indicating to the user of the electronic device that:

the next message outgoing to the message destination electronic device will be sent to the message destination electronic device by SMS messaging when the message destination electronic device does not obtain message receipt capability over IM messaging within a certain amount of time; and the next message outgoing to the message destination electronic device will be sent to the message destination electronic device by IM messaging when the message destination electronic device obtains message receipt capability over IM messaging within the certain amount of time.

15. The method of claim 14, wherein (b) includes communicating with a message service server to determine the availability of the message destination electronic device to receive messages over IM messaging.

16. The method of claim 15, wherein the message destination electronic device has message receipt capability over IM messaging if the message destination electronic device has an active session with an IM messaging service of the message service server.

17. The method of claim 15, wherein if the message destination electronic device does not currently have message receipt capability over IM messaging, the communication from the electronic device triggers the message service server to send a wake-up message to the message destination electronic device to wake-up an IM messaging component of a messaging client of the message destination electronic device.

18. The method of claim 14, wherein if the message destination electronic device does not currently have message receipt capability over IM messaging, the electronic device provoking a message service server to send a wake-up message to the message destination electronic device to wake-up an IM messaging component of a messaging client of the message destination electronic device.

* * * * *